United States Patent
Xu et al.

(10) Patent No.: US 10,367,355 B2
(45) Date of Patent: Jul. 30, 2019

(54) CASCADED MULTI-LEVEL INVERTER SYSTEM AND MODULATION METHOD THEREOF, AND CONTROLLER

(71) Applicant: SUNGROW POWER SUPPLY CO., LTD., Hefei, Anhui (CN)

(72) Inventors: Jun Xu, Anhui (CN); Yu Gu, Anhui (CN); Yilei Gu, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 139 days.

(21) Appl. No.: 15/499,152

(22) Filed: Apr. 27, 2017

(65) Prior Publication Data

US 2018/0054057 A1 Feb. 22, 2018

(30) Foreign Application Priority Data

Aug. 22, 2016 (CN) .......................... 2016 1 0700663

(51) Int. Cl.
| | | |
|---|---|---|
| H02J 3/18 | (2006.01) | |
| H02M 7/49 | (2007.01) | |
| H02J 3/38 | (2006.01) | |
| H02M 7/5387 | (2007.01) | |
| H02M 1/42 | (2007.01) | |
| H02M 7/487 | (2007.01) | |
| H02M 7/483 | (2007.01) | |

(52) U.S. Cl.
CPC ............ *H02J 3/1807* (2013.01); *H02J 3/383* (2013.01); *H02M 7/49* (2013.01);
(Continued)

(58) Field of Classification Search
CPC ........ H02J 3/1807; H02J 3/383; H02J 3/1821; H02M 7/49; H02M 7/53871;
(Continued)

(56) References Cited

U.S. PATENT DOCUMENTS

| | | | |
|---|---|---|---|
| 8,030,791 B2 * | 10/2011 | Lang ................... | H02M 5/4505 290/43 |
| 8,391,032 B2 * | 3/2013 | Garrity ................... | H02J 3/383 363/37 |

(Continued)

FOREIGN PATENT DOCUMENTS

| | | |
|---|---|---|
| CN | 1523726 A | 8/2004 |
| CN | 101447673 A | 6/2009 |

(Continued)

OTHER PUBLICATIONS

D. Voglitsis et al., "Investigation of the control scheme of a single phase Cascade H-Bridge multilevel converter capable for grid interconnection of a PV park along with reactive power regulation and maximum power point tracking," 2014 IEEE 5th International Symposium on Power Electronics for Distributed Generation Systems (PEDG), IEEE, Jun. 24, 2014, pp. 1-7, XP032629625, DOI: 10.1109/PEDG.2014.6878641 [retrieved on Aug. 14, 2014].

(Continued)

*Primary Examiner* — Emily P Pham
(74) *Attorney, Agent, or Firm* — Cantor Colburn LLP (57) ABSTRACT

A cascaded multi-level inverter system, a modulation method and a controller for the same are provided. The method includes performing a maximum power point tracking control based on a voltage signal and a current signal of each DC source and a voltage signal and a current signal of the power grid obtained by sampling, calculating a first modulation signal for suppressing power imbalance, and outputting the first modulation signal to each inverter unit; and calculating, based on the calculated reactive current instruction value, the calculated active current instruction value, and a current signal of the reactive compensation device obtained by sampling, a second modulation signal for causing an output power factor of the cascaded multi-level (Continued)

inverter system to be 1, and outputting the second modulation signal to the reactive compensation device.

11 Claims, 8 Drawing Sheets

(52) U.S. Cl.
CPC ....... *H02M 7/53871* (2013.01); *H02J 3/1821* (2013.01); *H02M 1/4208* (2013.01); *H02M 7/487* (2013.01); *H02M 2007/4835* (2013.01); *Y02B 70/126* (2013.01); *Y02P 80/112* (2015.11)

(58) Field of Classification Search
CPC ............... H02M 1/4208; H02M 7/487; H02M 2007/4835; Y02P 80/112; Y02B 70/126
See application file for complete search history.

(56) References Cited

U.S. PATENT DOCUMENTS

| | | | | |
|---|---|---|---|---|
| 8,587,160 B2* | 11/2013 | Dai | ..................... | H02M 5/4505 307/151 |
| 8,614,525 B2* | 12/2013 | Teichmann | ............... | H02J 3/26 307/82 |
| 9,276,407 B2* | 3/2016 | Norrga | ..................... | H02J 3/38 |
| 9,804,627 B2* | 10/2017 | Pan | ........................... | G05F 1/67 |
| 9,859,714 B2* | 1/2018 | Pahlevaninezhad | .... | H02J 3/382 |
| 2010/0289338 A1 | 11/2010 | Stauth et al. | | |
| 2011/0130889 A1* | 6/2011 | Khajehoddin | .......... | H02J 3/383 700/298 |
| 2014/0211529 A1* | 7/2014 | Kandasamy | .......... | H02M 7/797 363/131 |
| 2014/0306543 A1 | 10/2014 | Garrity et al. | | |
| 2016/0226253 A1* | 8/2016 | Abido | ..................... | H02J 3/383 |
| 2017/0214337 A1* | 7/2017 | Baronian | .............. | H02M 7/539 |

FOREIGN PATENT DOCUMENTS

| | | |
|---|---|---|
| CN | 105356512 A | 2/2016 |
| EP | 2790287 A2 | 10/2014 |

OTHER PUBLICATIONS

Extended European Search Report for corresponding Application No. 17168463.2-1809; dated Sep. 1, 2017.
SIPO First Office Action for corresponding CN Application No. 201610700663.3; dated May 18, 2018.
European Office Action corresponding to Application No. 17168463. 2-1201; dated Oct. 17, 2018.

* cited by examiner (Prior Art)

CASCADED MULTI-LEVEL INVERTER SYSTEM AND MODULATION METHOD THEREOF, AND CONTROLLER

CROSS REFERENCE TO RELATED APPLICATION

The present application claims the priority to Chinese Patent Application No. 201610700663.3, entitled "CASCADED MULTI-LEVEL INVERTER SYSTEM AND MODULATION METHOD THEREOF, AND CONTROLLER", filed on Aug. 22, 2016 with the State Intellectual Property Office of the People's Republic of China, which is incorporated herein by reference in its entirety.

TECHNICAL FIELD

The present disclosure relates to the technology field of inverter system modulation, and in particular to a cascaded multi-level inverter system, a modulation method and a controller for the same.

BACKGROUND

Figure 1:
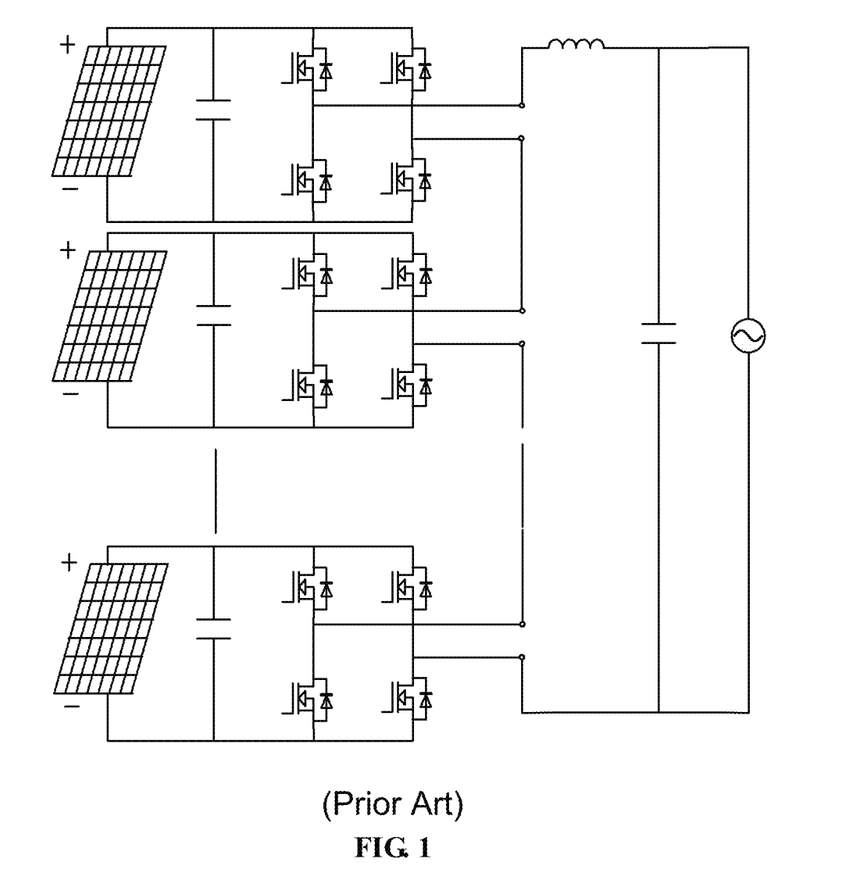
FIG. 1 is a schematic structural diagram of a cascaded multi-level inverter system in the prior art.

At present, cascaded multi-level technology, as a kind of mature technology, is well developed in fields of motor drive, medium voltage SVG and the like. In recent years, as a photovoltaic module is an independent direct current (DC) source, the cascaded multi-level technology is also widely used day by day in photovoltaic field. A cascaded multi-level inverter system can track a maximum power point of each photovoltaic module, and has a relative advantage in efficiency as a multi-level topology. The topology structure of the cascaded multi-level inverter system is shown in FIG. 1. However, there are some difficulties in applications of the cascaded multi-level inverter system in the photovoltaic field. For example, when the photovoltaic module fails, or is shielded, or is mismatched seriously, power of the photovoltaic module is unbalanced in different degrees, thereby leading to a problem of a low modulation voltage of the whole system and a modulation voltage saturation of an inverter module, and further seriously impacting working stability of a photovoltaic system which may result in a shutdown of the system for security.

To suppress the foregoing situations of power imbalance, a method of reactive power compensation is applied commonly in the prior art. The method is to inject capacitive or inductive reactive power into an output current, and compensate a modulation voltage to realize a stable operation of the whole system.

The above method of reactive power compensation to suppress the power imbalance may suppress the power imbalance with different degrees, but capacitive or inductive reactive power may also be injected into the power grid in the method, which is not allowed by the power grid.

SUMMARY

The present disclosure provides a cascaded multi-level inverter system, a modulation method and a controller for the same, to solve the problem of injecting reactive current into the power grid in the conventional technology.

The above object is achieved through the following technical solutions:

A modulation method for a cascaded multi-level inverter system is provided, which is applied to a controller for the cascaded multi-level inverter system. The cascaded multi-level inverter system includes a reactive compensation device and multiple inverter units connected with the controller, the reactive compensation device is connected with a power grid, and the inverter units are connected with multiple DC sources respectively. The modulation method includes:

performing a maximum power point tracking control based on a voltage signal and a current signal of each DC source and a voltage signal and a current signal of the power grid obtained by sampling, calculating a first modulation signal for suppressing power imbalance, and outputting the first modulation signal to each inverter unit;

calculating a reactive compensation current component based on the voltage signal and the current signal of each DC source and the voltage signal of the power grid obtained by sampling;

calculating a reactive current instruction value which is equal in size and opposite in direction to the reactive compensation current component based on the reactive compensation current component;

calculating an active current instruction value based on a DC-side voltage set value signal of the reactive compensation device, and a DC-side voltage signal of the reactive compensation device obtained by sampling; and calculating, based on the reactive current instruction value, the active current instruction value, and a current signal of the reactive compensation device obtained by sampling, a second modulation signal for causing an output power factor of the cascaded multi-level inverter system to be 1, and outputting the second modulation signal to the reactive compensation device.

Preferably, before the process of outputting the second modulation signal to the reactive compensation device, the method further includes:

calculating a harmonic current component based on the voltage signal and the current signal of the power grid obtained by sampling; and calculating, as an output, a second modulation signal for compensating total harmonic distortion, based on the harmonic current component and the second modulation signal for causing an output power factor of the cascaded multi-level inverter system to be 1.

Preferably, the process of performing a maximum power point tracking control based on a voltage signal and a current signal of each DC source and a voltage signal and a current signal of the power grid obtained by sampling, calculating a first modulation signal for suppressing power imbalance, includes:

performing a maximum power point tracking calculation and a maximum power point tracking control based on the voltage signal and the current signal of each DC source obtained by sampling, and acquiring a power instruction value of each inverter unit;

calculating a power gird current instruction value based on the power instruction value of each inverter unit, the reactive compensation current component, and the voltage signal of the power grid obtained by sampling;

calculating a modulation voltage instruction value based on the power grid current instruction value, and the current signal of the power grid obtained by sampling;

dividing the modulation voltage instruction value into an active modulation signal and a reactive modulation signal; and distributing the active modulation signal and the reactive modulation signal according to an active power distribution principle and a reactive power distribution principle respectively, and calculating, by means of vector synthesis, the first modulation signal to be outputted to each inverter unit.

A controller for a cascaded multi-level inverter system is provided, which is applied to a reactive compensation device and multiple inverter units of the cascaded multi-level inverter system. The reactive compensation device is connected with a power grid, and the multiple inverter units are connected with multiple DC sources respectively. The controller includes:

a first modulation module configured to perform a maximum power point tracking control based on a voltage signal and a current signal of each DC source, and a voltage signal and a current signal of the power grid obtained by sampling, calculate a first modulation signal for suppressing power imbalance, and output the first modulation signal to each inverter unit; and a second modulation module configured to calculate a reactive compensation current component based on the voltage signal and the current signal of each DC source and the voltage signal of the power grid obtained by sampling; calculate a reactive current instruction value which is equal in size and opposite in direction to the reactive compensation current component based on the reactive compensation current component; calculate an active current instruction value based on a DC-side voltage set value signal of the reactive compensation device, and a DC-side voltage signal of the reactive compensation device obtained by sampling; and calculate, based on the reactive current instruction value, the active current instruction value, and a current signal of the reactive compensation device obtained by sampling, a second modulation signal for causing an output power factor of the cascaded multi-level inverter system to be 1, and output the second modulation signal to the reactive compensation device.

Preferably, the second modulation module are further configured to:

calculate a harmonic current component based on the voltage signal and the current signal of the power grid obtained by sampling; and calculate, as an output, a second modulation signal for compensating total harmonic distortion, based on the harmonic current component and the second modulation signal for causing an output power factor of the cascaded multi-level inverter system to be 1.

Preferably, the first modulation module further includes:

a first controlling module configured to perform a maximum power point tracking calculation and a maximum power point tracking control based on the voltage signal and the current signal of each DC source obtained by sampling, and acquire a power instruction value of each inverter unit;

a first calculation module configured to calculate a power gird current instruction value based on the power instruction value of each inverter unit, the reactive compensation current component, and the voltage signal of the power grid obtained by sampling;

a second calculation module configured to calculate a modulation voltage instruction value based on the power grid current instruction value, and the current signal of the power grid obtained by sampling;

a third calculation module configured to divide the modulation voltage instruction value into an active modulation signal and a reactive modulation signal; and a fourth calculation module configured to distribute the active modulation signal and the reactive modulation signal according to an active power distribution principle and a reactive power distribution principle respectively, and calculate, by means of vector synthesis, the first modulation signal to be outputted to each inverter unit.

A cascaded multi-level inverter system is provided, which includes a reactive compensation device, multiple inverter units, and a controller in which any of the foregoing modulation methods for the cascaded multi-level inverter system is applied, the reactive compensation device is connected with a power grid;

the multiple inverter units are connected with multiple DC sources respectively; and the reactive compensation device is a voltage-type reactive compensation circuit, a current-type reactive compensation circuit or a switch clamping type three-level reactive compensation circuit.

Preferably, the voltage-type reactive compensation circuit includes an H-bridge inverter module, a first capacitor and a first inductor;

the first capacitor is connected between two input terminals of the H-bridge inverter module;

one end of the inductor is connected with one output terminal of the H-bridge inverter module; and the other end of the inductor and the other output terminal of the H-bridge inverter module are connected with the power grid respectively.

Preferably, the current-type reactive compensation circuit includes an H-bridge inverter module and a second inductor;

the second inductor is connected between two input terminals of the H-bridge inverter module; and two output terminals of the H-bridge inverter module are connected with the power grid respectively.

Preferably, the voltage-type compensation circuit includes an H-bridge inverter module, a second capacitor, a third capacitor, a first switching transistor, a second switching transistor and a third inductor;

the second capacitor and the third capacitor are connected in series between two input terminals of the H-bridge inverter module;

the series connection point between the second capacitor and the third capacitor is connected, through the first switching transistor and the second switching transistor which are connected in anti-series, with one output terminal of the H-bridge inverter module and one end of the third inductor;

the other end of the third inductor and the other output terminal of the H-bridge inverter module are connected with the power grid respectively.

With the modulation method for the cascaded multi-level inverter system provided in the present disclosure, firstly, a maximum power point tracking control is performed based on a voltage signal and a current signal of each DC source and a voltage signal and a current signal of the power grid obtained by sampling, a first modulation signal for suppressing power imbalance is calculated, and the first modulation signal is outputted to each inverter unit, thereby realizing the maximum power point tracking control and the power imbalance suppression. Then, based on the calculated reactive current instruction value, the calculated active current instruction value, and a current signal of a reactive compensation device obtained by sampling, a second modulation signal is calculated for causing an output power factor of the cascaded multi-level inverter system to be 1, and the second modulation signal is outputted to the reactive compensation device. The reactive current instruction value is equal in size and opposite in direction to a reactive compensation current component, thereby making an output power factor of the cascaded multi-level inverter system is 1 to meet requirements of the power grid.

BRIEF DESCRIPTION OF THE DRAWINGS

The accompany drawings used in the description of the embodiments will be described briefly as follows, so that the technical solutions based on the embodiments of the present disclosure will become more apparent. It is clear that the accompany drawings in the following description are only some embodiments of the present disclosure. For those skilled in the art, other accompany drawings may be obtained based on these accompany drawings without any creative work.

DETAILED DESCRIPTION OF THE EMBODIMENTS

For explaining objects, technical solutions and advantages of the disclosure more clearly, embodiments of the disclosure are further described hereinafter in conjunction with drawings.

The present disclosure provides a modulation method for a cascaded multi-level inverter system to solve the problem of injecting reactive power into the power grid in the prior art.

Figure 2:
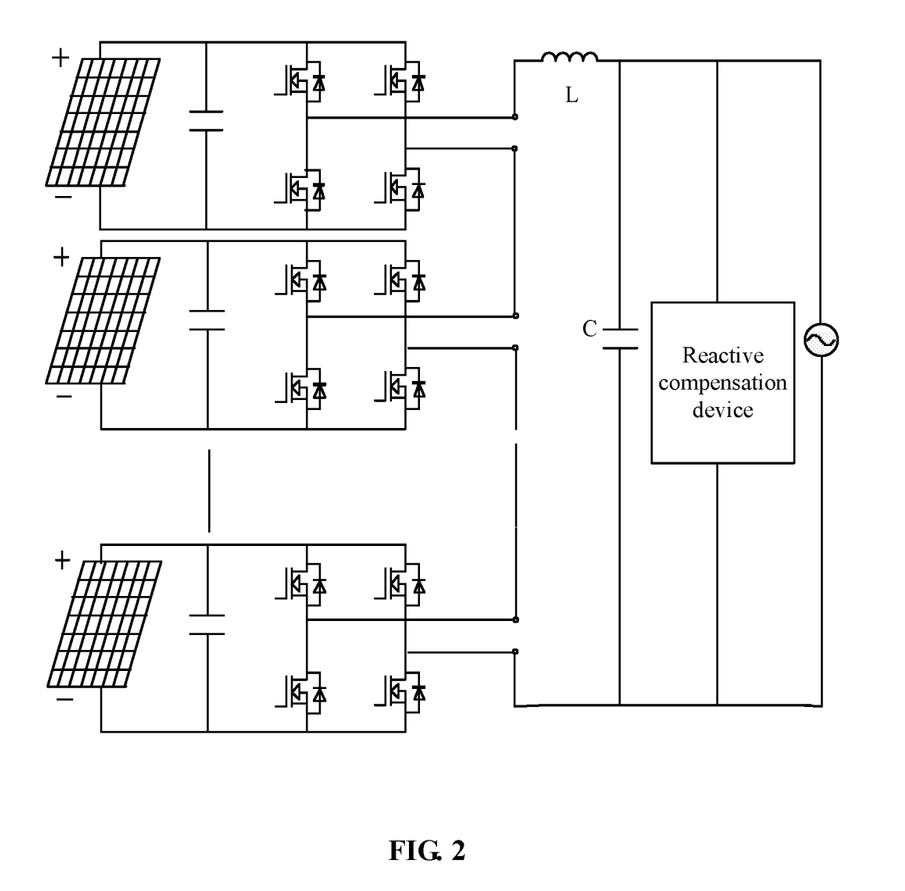
FIG. 2 is a schematic circuit diagram of a cascaded multi-level inverter system according to an embodiment of the present disclosure.
Figure 3:
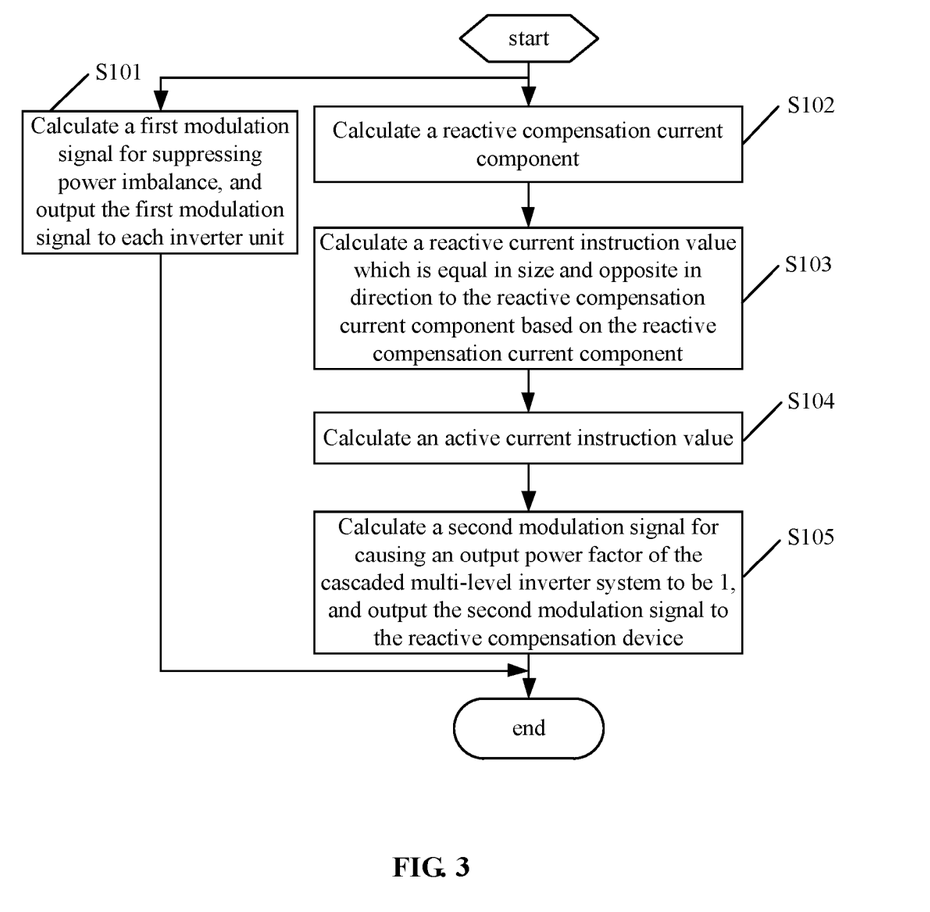
FIG. 3 is a flow diagram of a modulation method for a cascaded multi-level inverter system provided according to an embodiment of the present disclosure.

Specifically, the modulation method for the cascaded multi-level inverter system is applied to a controller for a cascaded multi-level inverter system. The cascaded multi-level inverter system, as shown in FIG. 2, includes a reactive compensation device and multiple inverter units connected with the controller (taking an H-bridge module as an example in FIG. 2). The reactive compensation device is connected with a power grid, and the inverter units are connected with multiple DC sources respectively. The modulation method for the cascaded multi-level inverter system, as shown in FIG. 3, includes steps S101 to S105.

In step S101, a maximum power point tracking control is performed based on a voltage signal and a current signal of each DC source and a voltage signal and a current signal of the power grid obtained by sampling, a first modulation signal is calculated for suppressing power imbalance, and the first modulation signal is outputted to each inverter unit.

In step S102, a reactive compensation current component is calculated based on the voltage signal and the current signal of each DC source and the voltage signal of the power grid obtained by sampling.

In step S103, a reactive current instruction value is calculated based on the reactive compensation current component. The reactive current instruction value is equal in size and opposite in direction to the reactive compensation current component.

In step S104, an active current instruction value is calculated based on a DC-side voltage set value signal of the reactive compensation device and a DC-side voltage signal of the reactive compensation device obtained by sampling.

In step S105, based on the reactive current instruction value, the active current instruction value, and a current signal of the reactive compensation device obtained by sampling, a second modulation signal is calculated for causing an output power factor of the cascaded multi-level inverter system to be 1, and the second modulation signal is outputted to the reactive compensation device.

By taking step S101 to control each inverter unit, suppress power imbalance, and realize stable operation of the whole cascaded multi-level inverter system, each DC source (taking a photovoltaic module as an example in FIG. 2) achieves MPPT (Maximum Power Point Tracking), and the power grid may be injected with reactive current for suppressing power imbalance.

Then by taking steps S102 to S105 to control the reactive compensation device and eliminate the reactive current for suppressing power imbalance by means of a reactive current instruction value which is equal in size and opposite in direction to the reactive compensation current component, an output power factor of the cascaded multi-level inverter system becomes 1, for meeting requirements of the power grid.

In practice, the sequence between step S101 and steps S102 to S105 is not defined, but depends on the specific application environment, and FIG. 3 is only an example. Any solutions which can realize MPPT control of each DC source, power imbalance suppression and an output power factor of the cascaded multi-level inverter system being 1 fall within the scope of the present disclosure.

With the modulation method for the cascaded multi-level inverter system provided in embodiments of the present disclosure, by taking the foregoing steps, a photovoltaic module is still capable of being in a MPPT working state even in situations that the photovoltaic module is serious unbalanced, for example, when a part of the photovoltaic module fails, or is shielded, or is damaged. The system can realize stable power generation; and the output power factor is 1, which meets requirements of the power grid, thereby solving the problem in the prior art.

It is important to note that, there are also solutions to suppress power imbalance and realize the system stable operation by means of the MPPT working area, which are only capable of suppressing a part of relative mild imbalance. And a cost for the suppressing is a considerable loss of power generation, which may cause great economic losses.

With the modulation method for the cascaded multi-level inverter system provided in embodiments of the present disclosure, each DC source (taking a photovoltaic module as an example in FIG. 2) is able to perform MPPT, thus realizing the function of normal MPPT grid-connected power generation, the normal electric energy production is ensured, and the economic losses in the prior art are avoided.

Figure 4:
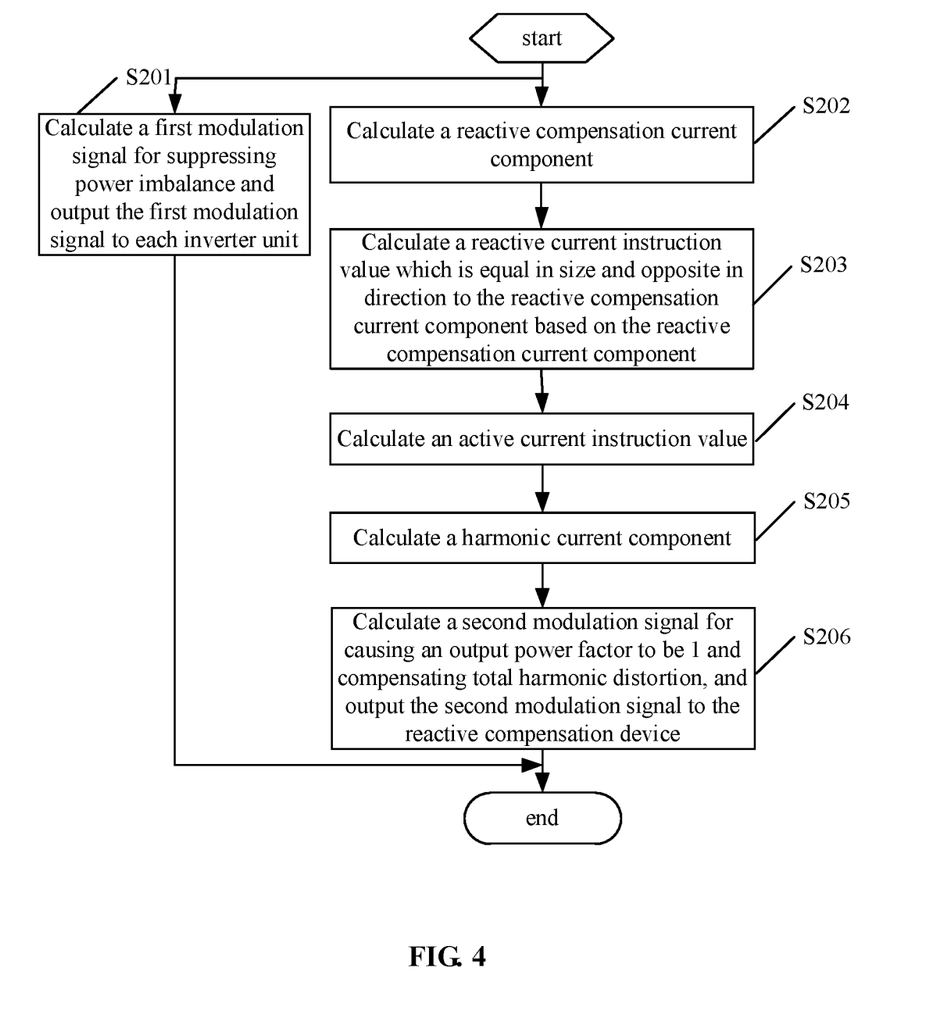
FIG. 4 is a flow diagram of a modulation method for a cascaded multi-level inverter system provided according to an embodiment of the present disclosure.

Another modulation method for a cascaded multi-level inverter system is provided in another preferred embodiment of the present disclosure, as shown in FIG. 4, which includes steps S201 to S206.

In step S201, a maximum power point tracking control is performed based on a voltage signal and a current signal of each DC source and a voltage signal and a current signal of the power grid obtained by sampling, a first modulation signal is calculated for suppressing power imbalance, and the first modulation signal is outputted to each inverter unit.

In step S202, a reactive compensation current component is calculated based on the voltage signal and the current signal of each DC source and the voltage signal of the power grid obtained by sampling.

In step S203, a reactive current instruction value is calculated based on the reactive compensation current component. The reactive current instruction value is equal in size and opposite in direction to the reactive compensation current component.

In step S204, an active current instruction value is calculated based on a DC-side voltage set value signal of the reactive compensation device and a DC-side voltage signal of the reactive compensation device obtained by sampling.

In step S205, a harmonic current component is calculated based on the voltage signal and the current signal of the power grid obtained by sampling.

In step S206, based on the harmonic current component, the reactive current instruction value, the active current instruction value, and a current signal of the reactive compensation device obtained by sampling, a second modulation signal is calculated for causing an output power factor of the cascaded multi-level inverter system to be 1 and compensating total harmonic distortion, and the second modulation signal is outputted to the reactive compensation device.

By taking steps S205 and S206, the reactive compensation device may also function as a harmonic current compensation device to compensate THD (Total Harmonic Distortion) of an input current, thereby decreasing THD of an output current; and facilitating the application of the cascaded multi-level inverter system.

In practice, the sequence between step S201 and steps S202 to S206 is not defined, but depends on the specific application environment, and FIG. 4 is only an example. Any solutions which can realize MPPT control of each DC source, power imbalance suppression, an output power factor of the cascaded multi-level inverter system being 1 and reduction of THD of an output current fall within the scope of the present disclosure.

Figure 5:
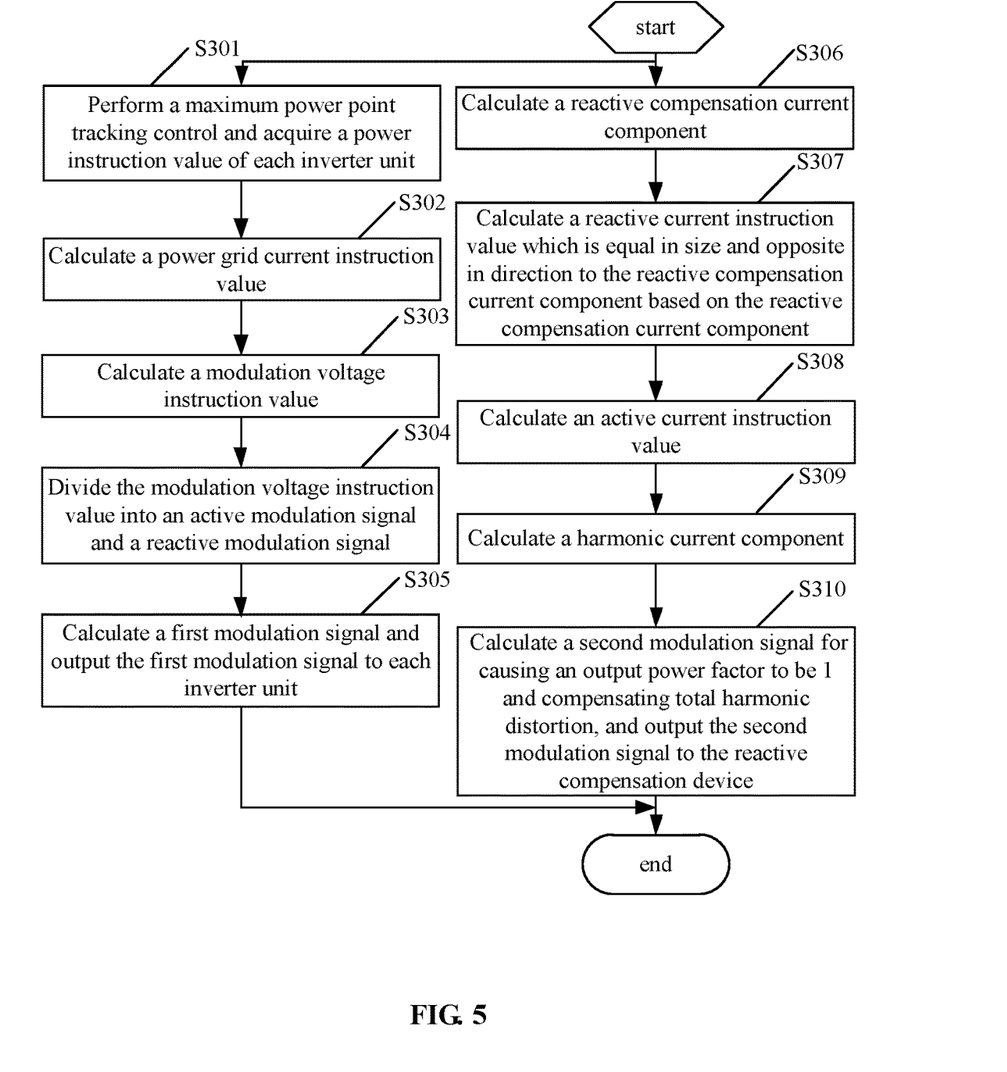
FIG. 5 is a flow diagram of a modulation method for a cascaded multi-level inverter system provided according to an embodiment of the present disclosure.

Another modulation method for a cascaded multi-level inverter system is provided in another preferred embodiment of the present disclosure, as shown in FIG. 5, which includes steps S301 to S310.

In step S301, a maximum power point tracking calculation and a maximum power point tracking control are performed based on the voltage signal and the current signal of each DC source obtained by sampling, and a power instruction value of each inverter unit is acquired.

In step S302, a power gird current instruction value is calculated based on the power instruction value of each inverter unit, the reactive compensation current component, and the voltage signal of the power grid obtained by sampling.

In step S303, a modulation voltage instruction value is calculated based on the power grid current instruction value, and the current signal of the power grid obtained by sampling.

In step S304, the modulation voltage instruction value is divided into an active modulation signal and a reactive modulation signal.

In practice, the dividing of the modulation voltage instruction value may be performed in combination with a power factor angle and the like, which is not defined here but depends on the specific application environment.

In step S305, the active modulation signal and the reactive modulation signal are distributed according to an active power distribution principle and a reactive power distribution principle respectively, the first modulation signal to be outputted to each inverter unit is calculated by means of vector synthesis, and the first modulation signal is outputted to each inverter unit.

In step S306, a reactive compensation current component is calculated based on the voltage signal and the current signal of each DC source and the voltage signal of the power grid obtained by sampling.

In step S307, a reactive current instruction value is calculated based on the reactive compensation current component. The reactive current instruction value is equal in size and opposite in direction to the reactive compensation current component.

In step S308, an active current instruction value is calculated based on a DC-side voltage set value signal of the reactive compensation device and a DC-side voltage signal of the reactive compensation device obtained by sampling.

In step S309, a harmonic current component is calculated based on the voltage signal and the current signal of the power grid obtained by sampling.

In step S310, based on the harmonic current component, the reactive current instruction value, the active current instruction value, and a current signal of the reactive compensation device obtained by sampling, a second modulation signal is calculated for causing an output power factor of the cascaded multi-level inverter system to be 1 and compensating total harmonic distortion, and the second modulation signal is outputted to the reactive compensation device.

With the specific method for controlling each inverter unit provided in the steps S301 to S305, a photovoltaic module is still capable of being in a MPPT working state even in situations that the photovoltaic module is serious unbalanced, for example, when a part of the photovoltaic module fails, or is shielded, or is damaged, thereby realizing the system generate power stably.

Of course, solutions for controlling each DC source to be in a MPPT working state and for suppressing power imbalance are not limited to these embodiments and may be selected and varied based on specific application environment. Any solutions which can realize MPPT of each DC source and suppress power imbalance fall within the scope of the present disclosure.

Figure 6:
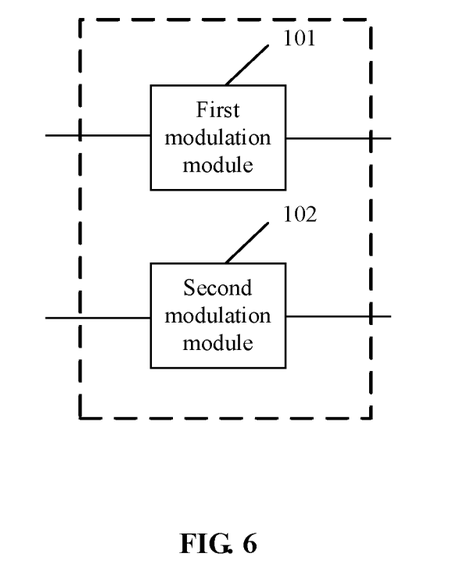
FIG. 6 is a schematic structural diagram of a controller for a cascaded multi-level inverter system according to an embodiment of the present disclosure.

Another embodiment of the present disclosure provides a controller for a cascaded multi-level inverter system, which is applied to a reactive compensation device and multiple inverter units of the cascaded multi-level inverter system. The reactive compensation device is connected with a power grid, and the multiple inverter units are connected with multiple DC sources respectively. The controller for the cascaded multi-level inverter system, as shown in FIG. 6, includes a first modulation module 101 and a second modulation module 102.

The first modulation module 101 is configured to perform a maximum power point tracking control based on a voltage signal ($v_{pv1}$, $v_{pv2}$ ... $v_{pvn}$) and a current signal ($i_{pv1}$, $i_{pv2}$ ... $i_{pvn}$) of each DC source and a voltage signal $v_s$ of the power grid and a current signal $i_s$ of the power grid obtained by sampling, calculate a first modulation signal ($v_{H1}^*$, $v_{H2}^* \ldots v_{Hn}^*$) for suppressing power imbalance, and output the first modulation signal ($v_{H1}^*$, $v_{H2}^* \ldots v_{Hn}^*$) to each inverter unit.

The second modulation module 102 is configured to calculate a reactive compensation current component $i_{sq}^*$ based on the voltage signal ($v_{pv1}, v_{pv2} \ldots v_{pvn}$) and the current signal ($i_{pv1}, i_{pv2} \ldots i_{pvn}$) of each DC source and the voltage signal $v_s$ of the power grid obtained by sampling, calculate a reactive current instruction value which is equal in size and opposite in direction to the reactive compensation current component based on the reactive compensation current component $i_{sq}^*$, calculate an active current instruction value $i_{rsq}^*$ based on a DC-side voltage set value signal $v_{rdc}^*$ of the reactive compensation device and a DC-side voltage signal $v_{rdc}$ of the reactive compensation device obtained by sampling, and calculate, based on the reactive current instruction value, the active current instruction value $i_{rsq}^*$ and a current signal $i_{rs}$ of the reactive compensation device obtained by sampling, a second modulation signal $v_r^*$ for causing an output power factor of the cascaded multi-level inverter system to be 1, and output the second modulation signal $v_r^*$ to the reactive compensation device.

With the controller for the cascaded multi-level inverter system provided in embodiments of the present disclosure, based on the foregoing theory, a photovoltaic module is still capable of being in a MPPT working state even in situations that the photovoltaic module is serious unbalanced, for example, when a part of the photovoltaic module fails, or is shielded, or is damaged. The system can realize stable power generation; and the output power factor is 1, which meets requirements of the power grid, thereby solving the problem in the prior art.

Preferably, a second modulation module 102 is further configured to:

calculate a harmonic current component $i_{sh}^*$ based on the voltage signal $v_s$ of the power grid and the current signal is of the power grid obtained by sampling; and calculate, as an output, a second modulation signal $v_r^*$ for compensating total harmonic distortion, based on the harmonic current component $i_{sh}^*$ and the second modulation signal for causing an output power factor of the cascaded multi-level inverter system to be 1.

With the controller for the cascaded multi-level inverter system provided in embodiments of the present disclosure, the reactive compensation device may also function as a harmonic current compensation device to compensate THD of an input current; and facilitating the application of the cascaded multi-level inverter system.

Figure 7:
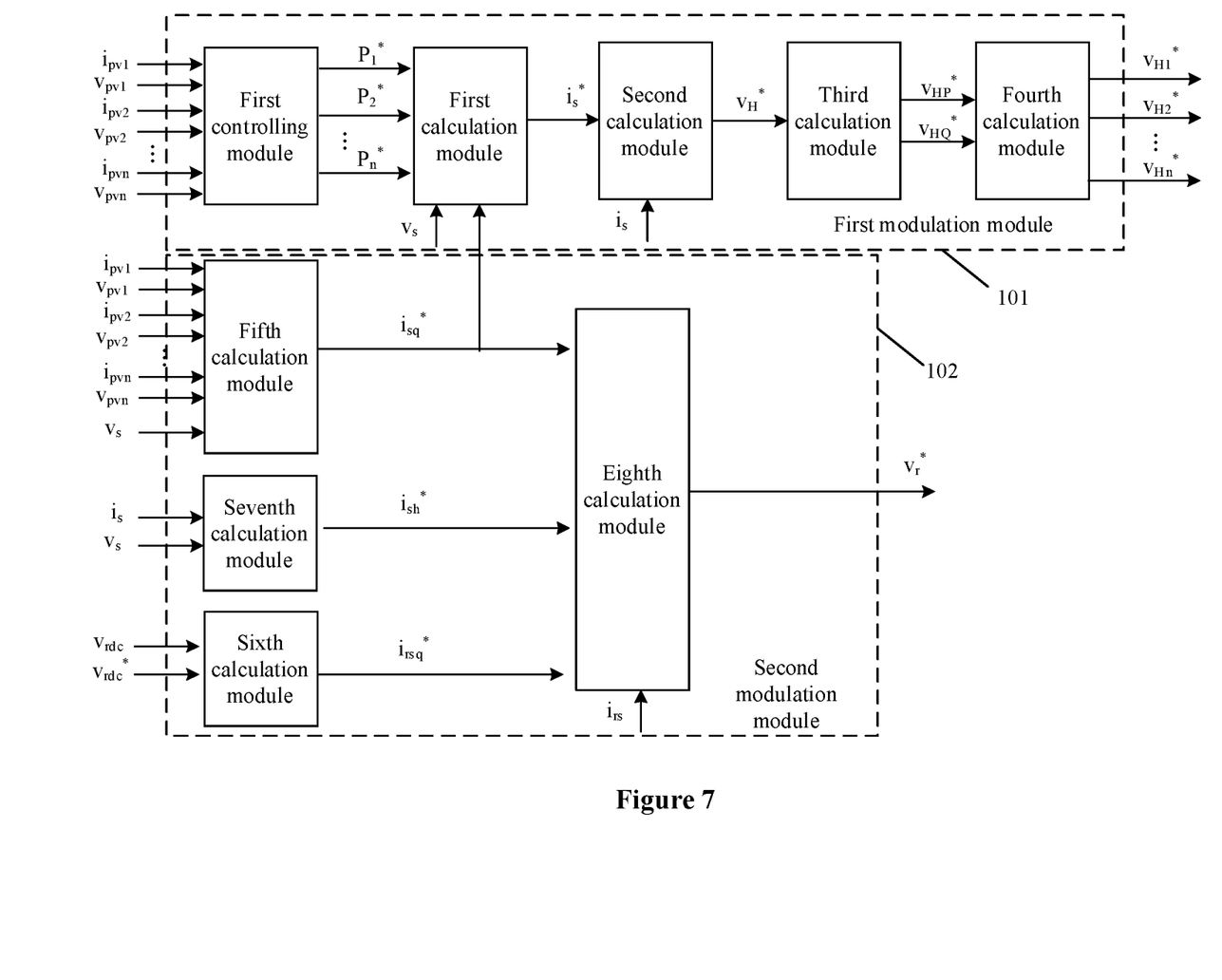
FIG. 7 is a schematic structural diagram of a controller for a cascaded multi-level inverter system according to an embodiment of the present disclosure.

Specifically, as shown in FIG. 7, a first modulation module 101 includes a first controlling module, a first calculation module, a second calculation module, a third calculation module and a fourth calculation module.

The first controlling module is configured to perform a maximum power point tracking calculation and a maximum power point tracking control based on the voltage signal ($v_{pv1}, v_{pv2} \ldots v_{pvn}$) and the current signal ($i_{pv1}, i_{pv2} \ldots i_{pvn}$) of each DC source obtained by sampling, and acquire a power instruction value ($P_1^*, P_2^* \ldots P_n^*$) of each inverter unit.

The first calculation module is configured to calculate a power gird current instruction value $i_s^*$ based on the power instruction value ($P_1^*, P_2^* \ldots P_n^*$) of each inverter unit, the reactive compensation current component $i_{sq}^*$, and the voltage signal $v_s$ of the power grid obtained by sampling.

The second calculation module is configured to calculate a modulation voltage instruction value $v_H^*$ based on the power grid current instruction value $i_s^*$, and the current signal $i_s$ of the power grid obtained by sampling.

The third calculation module is configured to divide the modulation voltage instruction value $v_H^*$ into an active modulation signal $v_{HP}^*$ and a reactive modulation signal $v_{HQ}^*$.

The fourth calculation module is configured to distribute the active modulation signal $v_{HP}^*$ and the reactive modulation signal $v_{HQ}^*$ according to an active power distribution principle and a reactive power distribution principle respectively, and calculate, by means of vector synthesis, the first modulation signal ($v_{H1}^*, v_{H2}^* \ldots v_{Hn}^*$) to be outputted to each inverter unit.

A second modulation module 102 includes a fifth calculation module, a sixth calculation module, a seventh calculation module and an eighth calculation module.

The fifth calculation module is configured to calculate a reactive compensation current component $i_{sq}^*$ based on a voltage signal ($v_{pv1}, v_{pv2} \ldots v_{pvn}$) and a current signal ($i_{pv1}, i_{pv2} \ldots i_{pvn}$) of each DC source and the voltage signal $v_s$ of the power grid obtained by sampling.

The sixth calculation module is configured to calculate an active current instruction value $i_{rsq}^*$ based on a DC-side voltage set value signal $v_{rdc}^*$ of the reactive compensation device and a DC-side voltage signal $v_{rdc}$ of the reactive compensation device obtained by sampling.

The seventh calculation module is configured to calculate a harmonic current component $i_{sh}^*$ based on the voltage signal $v_s$ of the power grid and the current signal $i_s$ of the power grid obtained by sampling.

The eighth calculation module is configured to calculate, based on the reactive compensation current component $i_{sq}^*$, a reactive current instruction value which is equal in size and opposite in direction to the reactive compensation current component $i_{sq}^*$, calculate, based on the harmonic current component $i_{sh}^*$, the reactive current instruction value, the active current instruction value $i_{rsq}^*$ and a current signal $i_{rs}$ of the reactive compensation device obtained by sampling, a second modulation signal for causing an output power factor of the cascaded multi-level inverter system to be 1 and compensating total harmonic distortion, and output the second modulation signal $v_r^*$ to the reactive compensation device.

The specific operating principle of the controller is the same to the foregoing embodiments, which will not be described in detail herein for simplicity.

A cascaded multi-level inverter system is further provided in another embodiment of the present disclosure, as shown in FIG. 2. The system includes a reactive compensation device, multiple inverter units (taking an H-bridge module as an example in FIG. 2), a filter capacitor C, a filter inductor L and a controller. The controller adopts the modulation method for the cascaded multi-level inverter system described in any embodiment above to realize power imbalance suppression, MPPT controlling of each DC source, an output power factor of 1 and compensation of THD of an input current.

The reactive compensation device is connected with the power grid.

The multiple inverter units are connected with multiple DC sources respectively.

Optionally, the reactive compensation device is a voltage-type reactive compensation circuit, a current-type reactive compensation circuit or a switch clamping type three-level reactive compensation circuit.

Figure 8:
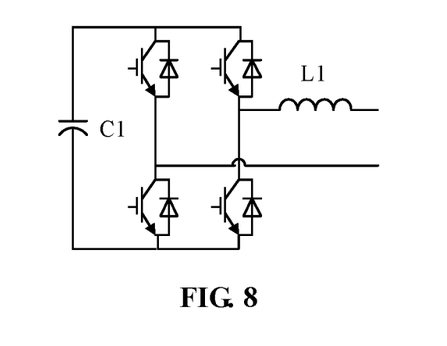
FIG. 8 is a schematic circuit diagram of a reactive compensation device according to an embodiment of the present disclosure.

Referring to FIG. 8, the voltage-type reactive compensation circuit includes an H-bridge inverter module, a first capacitor C1 and a first inductor L1.

The first capacitor C1 is connected between two input terminals of the H-bridge inverter module.

One end of a first inductor L1 is connected with one output terminal of the H-bridge inverter module.

The other end of a first inductor L1 and the other output terminal of the H-bridge inverter module are connected with the power grid respectively.

Figure 9:
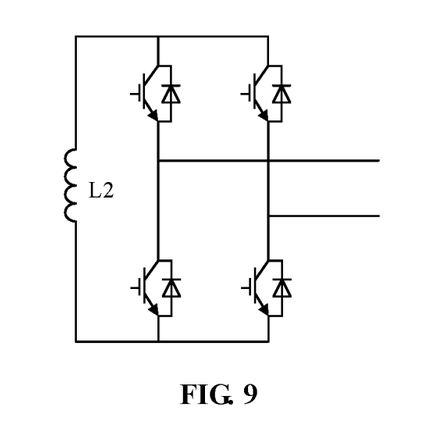
FIG. 9 is a schematic circuit diagram of a reactive compensation device according to an embodiment of the present disclosure.

Referring to FIG. 9, the current-type reactive compensation circuit includes an H-bridge inverter module and a second inductor L2.

The second inductor L2 is connected between two input terminals of the H-bridge inverter module Two output terminals of the H-bridge inverter module are connected with the power grid respectively.

Figure 10:
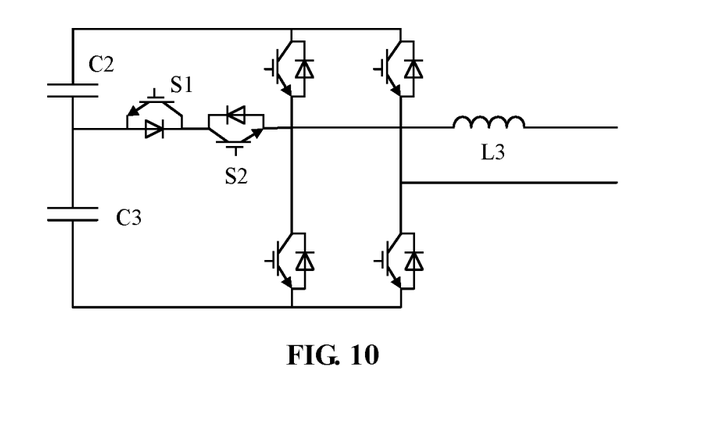
FIG. 10 is a schematic circuit diagram of a reactive compensation device according to an embodiment of the present disclosure.

Referring to FIG. 10, the voltage-type compensation circuit includes an H-bridge inverter module, a second capacitor C2, a third capacitor C3, a first switching transistor S1, a second switching transistor S2 and a third inductor L3.

The second capacitor C2 and a third capacitor C3 are connected in series between two input terminals of the H-bridge inverter module.

The series connection point between a second capacitor C2 and a third capacitor C3 is connected, through a first switching transistor S1 and a second switching transistor S2 which are connected in anti-series, with one output terminal of the H-bridge inverter module and one end of a third inductor L3.

The other end of a third inductor L3 and the other output terminal of the H-bridge inverter module are connected with the power grid respectively.

In practice, the reactive compensation device may be a bridge circuit composed of a semiconductor, a capacitor, an inductor and the like, such as a voltage-type reactive compensation circuit (as shown in FIG. 8 as a typical example) and a current-type reactive compensation circuit (as shown in FIG. 9 as a typical example). Of course, the reactive compensation device may also be combined with multi-level technology to form all kinds of derivative circuits, such as a switch clamping type three-level reactive compensation circuit shown in FIG. 10. However, specific implementation forms of the reactive compensation device are not limited to examples shown in FIG. 8 to FIG. 10, and may depend on specific application environments, which all fall within the scope of the present disclosure.

The specific operating principle of the cascaded multi-level inverter system is the same to the foregoing embodiments, which will not be described in detail herein for simplicity.

What is described above is only the preferable embodiments of the disclosure and is not intended to define the disclosure in any form. Though the disclosure is disclosed by way of preferred embodiments as described above, those embodiments are not intended to limit the disclosure. Numerous alternations, modifications, and equivalents can be made to the technical solution of the disclosure by those skilled in the art in light of the technical content disclosed herein without deviation from the scope of the disclosure. Therefore, any alternations, modifications, and equivalents made to the embodiments above according to the technical essential of the disclosure without deviation from the scope of the disclosure should fall within the scope of protection of the disclosure.

The invention claimed is:

1. A modulation method for a cascaded multi-level inverter system, applied to a controller for the cascaded multi-level inverter system, the cascaded multi-level inverter system comprising a reactive compensation device and a plurality of inverter units, the reactive compensation device and the plurality of inverter units being connected with the controller, the reactive compensation device being connected with a power grid, the plurality of inverter units being connected with a plurality of DC sources respectively, the modulation method comprising:
   performing a maximum power point tracking control based on a voltage signal and a current signal of each of the plurality of DC sources and a voltage signal and a current signal of the power grid obtained by sampling, calculating a first modulation signal for suppressing power imbalance, and outputting the first modulation signal to each of the plurality of inverter units;
   calculating a reactive compensation current component based on the voltage signal and the current signal of each of the plurality of DC sources and the voltage signal of the power grid obtained by sampling;
   calculating a reactive current instruction value which is equal in size and opposite in direction to the reactive compensation current component based on the reactive compensation current component;
   calculating an active current instruction value based on a DC-side voltage set value signal of the reactive compensation device, and a DC-side voltage signal of the reactive compensation device obtained by sampling; and
   calculating, based on the reactive current instruction value, the active current instruction value, and a current signal of the reactive compensation device obtained by sampling, a second modulation signal for causing an output power factor of the cascaded multi-level inverter system to be 1, and outputting the second modulation signal to the reactive compensation device.

2. The modulation method for the cascaded multi-level inverter system according to claim 1, wherein before the process of outputting the second modulation signal to the reactive compensation device, the method further comprises:
   calculating a harmonic current component based on the voltage signal and the current signal of the power grid obtained by sampling; and
   calculating, as an output, a second modulation signal for compensating total harmonic distortion, based on the harmonic current component and the second modulation signal for causing an output power factor of the cascaded multi-level inverter system to be 1.

3. The modulation method for the cascaded multi-level inverter system according to claim 1, wherein the process of performing a maximum power point tracking control based on a voltage signal and a current signal of each of the plurality of DC sources and a voltage signal and a current signal of the power grid obtained by sampling and calculating a first modulation signal for suppressing power imbalance, comprises:
   performing a maximum power point tracking calculation and a maximum power point tracking control based on the voltage signal and the current signal of each of the plurality of DC sources obtained by sampling, and acquiring a power instruction value of each of the plurality of inverter units;
   calculating a power gird current instruction value based on the power instruction value of each of the plurality of inverter units, the reactive compensation current component, and the voltage signal of the power grid obtained by sampling;

calculating a modulation voltage instruction value based on the power grid current instruction value, and the current signal of the power grid obtained by sampling;

dividing the modulation voltage instruction value into an active modulation signal and a reactive modulation signal; and distributing the active modulation signal and the reactive modulation signal according to an active power distribution principle and a reactive power distribution principle respectively, and calculating, by means of vector synthesis, the first modulation signal to be outputted to each of the plurality of inverter units.

4. A cascaded multi-level inverter system, comprising a reactive compensation device, a plurality of inverter units, and a controller in which the modulation method for the cascaded multi-level inverter system according to claim 1 is applied, wherein the reactive compensation device is connected with a power grid;

the plurality of inverter units are connected with a plurality of DC sources respectively; and the reactive compensation device is a voltage-type reactive compensation circuit, a current-type reactive compensation circuit or a switch clamping type three-level reactive compensation circuit.

5. The cascaded multi-level inverter system according to claim 4, wherein the voltage-type reactive compensation circuit comprises an H-bridge inverter module, a first capacitor and a first inductor; wherein the first capacitor is connected between two input terminals of the H-bridge inverter module;

one end of the first inductor is connected with one output terminal of the H-bridge inverter module; and the other end of the first inductor and the other output terminal of the H-bridge inverter module are connected with the power grid respectively.

6. The cascaded multi-level inverter system according to claim 4, wherein the current-type reactive compensation circuit comprises an H-bridge inverter module and a second inductor; wherein the second inductor is connected between two input terminals of the H-bridge inverter module; and two output terminals of the H-bridge inverter module are connected with the power grid respectively.

7. The cascaded multi-level inverter system according to claim 4, wherein the voltage-type reactive compensation circuit comprises an H-bridge inverter module, a second capacitor, a third capacitor, a first switching transistor, a second switching transistor and a third inductor; wherein the second capacitor and the third capacitor are connected in series between two input terminals of the H-bridge inverter module;

the series connection point between the second capacitor and the third capacitor is connected, through the first switching transistor and the second switching transistor which are connected in anti-series, with one output terminal of the H-bridge inverter module and one end of the third inductor; and the other end of the third inductor and the other output terminal of the H-bridge inverter module are connected with the power grid respectively.

8. A controller for a cascaded multi-level inverter system, the cascaded multi-level inverter system comprising a reactive compensation device and a plurality of inverter units, the controller being applied to the reactive compensation device and the plurality of inverter units, the reactive compensation device being connected with a power grid, the plurality of inverter units being connected with a plurality of DC sources respectively, the controller comprising:

a first modulation module configured to perform a maximum power point tracking control based on a voltage signal and a current signal of each of the plurality of DC sources and a voltage signal and a current signal of the power grid obtained by sampling, calculate a first modulation signal for suppressing power imbalance, and output the first modulation signal to each of the plurality of inverter units; and a second modulation module configured to calculate a reactive compensation current component based on the voltage signal and the current signal of each of the plurality of DC sources and the voltage signal of the power grid obtained by sampling; calculate a reactive current instruction value which is equal in size and opposite in direction to the reactive compensation current component based on the reactive compensation current component; calculate an active current instruction value based on a DC-side voltage set value signal of the reactive compensation device, and a DC-side voltage signal of the reactive compensation device obtained by sampling; and calculate, based on the reactive current instruction value, the active current instruction value, and a current signal of the reactive compensation device obtained by sampling, a second modulation signal for causing an output power factor of the cascaded multi-level inverter system to be 1, and output the second modulation signal to the reactive compensation device.

9. The controller for the cascaded multi-level inverter system according to claim 8, wherein the second modulation module is further configured to:

calculate a harmonic current component based on the voltage signal and the current signal of the power grid obtained by sampling; and calculate, as an output, a second modulation signal for compensating total harmonic distortion, based on the harmonic current component and the second modulation signal for causing an output power factor of the cascaded multi-level inverter system to be 1.

10. The controller for the cascaded multi-level inverter system according to claim 8, wherein the first modulation module comprises:

a first controlling module configured to perform a maximum power point tracking calculation and a maximum power point tracking control based on the voltage signal and the current signal of each of the plurality of DC sources obtained by sampling, and acquire a power instruction value of each of the plurality of inverter units;

a first calculation module configured to calculate a power gird current instruction value based on the power instruction value of each of the plurality of inverter units, the reactive compensation current component, and the voltage signal of the power grid obtained by sampling;

a second calculation module configured to calculate a modulation voltage instruction value based on the power grid current instruction value, and the current signal of the power grid obtained by sampling;

a third calculation module configured to divide the modulation voltage instruction value into an active modulation signal and a reactive modulation signal; and a fourth calculation module configured to distribute the active modulation signal and the reactive modulation signal according to an active power distribution principle and a reactive power distribution principle respectively, and calculate, by means of vector synthesis, the first modulation signal to be outputted to each of the plurality of inverter units.

11. The controller for the cascaded multi-level inverter system according to claim 9, wherein the first modulation module comprises:
- a first controlling module configured to perform a maximum power point tracking calculation and a maximum power point tracking control based on the voltage signal and the current signal of each of the plurality of DC sources obtained by sampling, and acquire a power instruction value of each of the plurality of inverter units;
- a first calculation module configured to calculate a power gird current instruction value based on the power instruction value of each of the plurality of inverter units, the reactive compensation current component, and the voltage signal of the power grid obtained by sampling;
- a second calculation module configured to calculate a modulation voltage instruction value based on the power grid current instruction value, and the current signal of the power grid obtained by sampling;
- a third calculation module configured to divide the modulation voltage instruction value into an active modulation signal and a reactive modulation signal; and
- a fourth calculation module configured to distribute the active modulation signal and the reactive modulation signal according to an active power distribution principle and a reactive power distribution principle respectively, and calculate, by means of vector synthesis, the first modulation signal to be outputted to each of the plurality of inverter units.

* * * * *